United States Patent
Akuta et al.

[15] 3,678,192
[45] July 18, 1972

[54] METHOD AND APPARATUS FOR DIGITAL MEASUREMENT WITH AN INDUSTRIAL TELEVISION

[72] Inventors: Tomohiko Akuta; Yoshi Honsyo; Sinya Hashirizaki; Teruo Hiruma, all of Kitakyushu; Kazuo Kurasawa, Hamamatsu, all of Japan

[73] Assignee: Nippon Steel Corporation, Tokyo, Japan

[22] Filed: Aug. 13, 1969

[21] Appl. No.: 849,651

[52] U.S. Cl..........................178/7.83, 178/6.8, 178/DIG. 36
[51] Int. Cl......................................H04n 7/18, G10b 7/02
[58] Field of Search...................178/6, 7.85, 7.83, DIG. 21, 178/DIG. 36; 350/156, 160, 171

[56] References Cited

UNITED STATES PATENTS

| | | | |
|---|---|---|---|
| 3,035,478 | 5/1962 | Laycak | 356/160 |
| 3,094,623 | 6/1963 | Weiss | 350/160 |
| 3,101,415 | 8/1963 | Libenscher | 250/219 |
| 3,222,979 | 12/1965 | Webster | 356/160 |
| 3,261,967 | 7/1966 | Rosin et al. | 235/151 |
| 3,280,692 | 10/1966 | Milnes et al. | 88/14 |
| 3,384,753 | 5/1968 | Revesz | 356/160 X |
| 3,175,089 | 3/1965 | Talley et al. | 178/DIG. 21 |

*Primary Examiner*—Robert L. Griffin
*Assistant Examiner*—Richard K. Eckert, Jr.
*Attorney*—Wenderoth, Lind & Ponack

[57] ABSTRACT

A method and apparatus for measuring at high precision dimensions of an object to be measured from a remote position by using an image pickup apparatus, wherein a scale graduated at a fixed spacing in the direction of the horizontal scanning line is projected on the photoelectric surface of the image pickup apparatus, the image of the said scale is focused as superposed on the image of the object on the image pickup tube and video signal output of said projected scale lines corresponding to the length of the optical image of the dimension to be measured is taken out as voltage pulses, the number of which is counted.

2 Claims, 16 Drawing Figures

Patented July 18, 1972
3,678,192
4 Sheets-Sheet 1
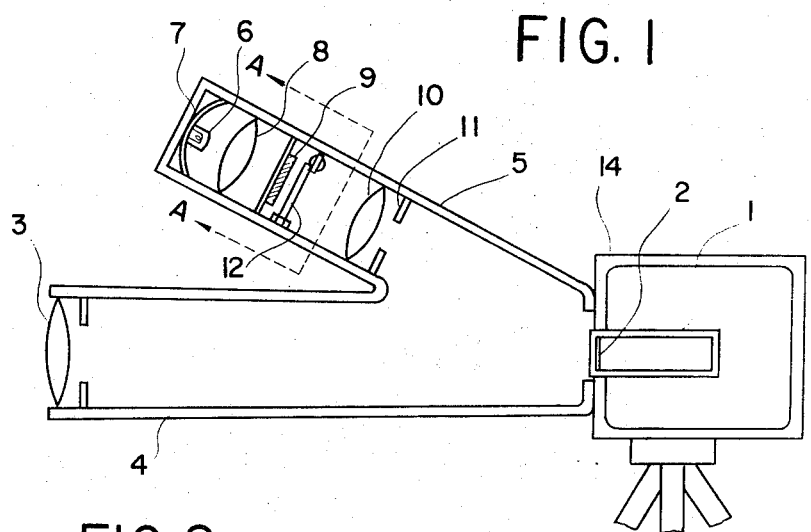
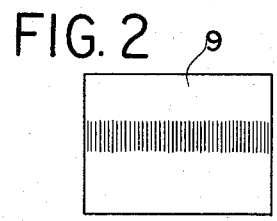
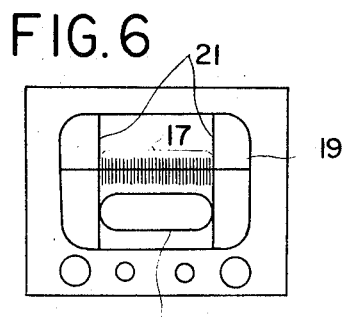
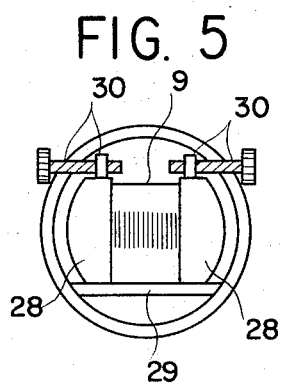
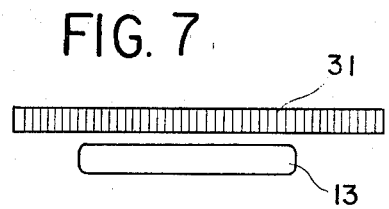
INVENTORS
Tomohiko Akuta
Yoshio Honsyō
Sinya Hashirizaki
Teruo Hiruma
Kazuo Kurasawa
BY Wenderoth, Lind & Ponack
ATTORNEYS

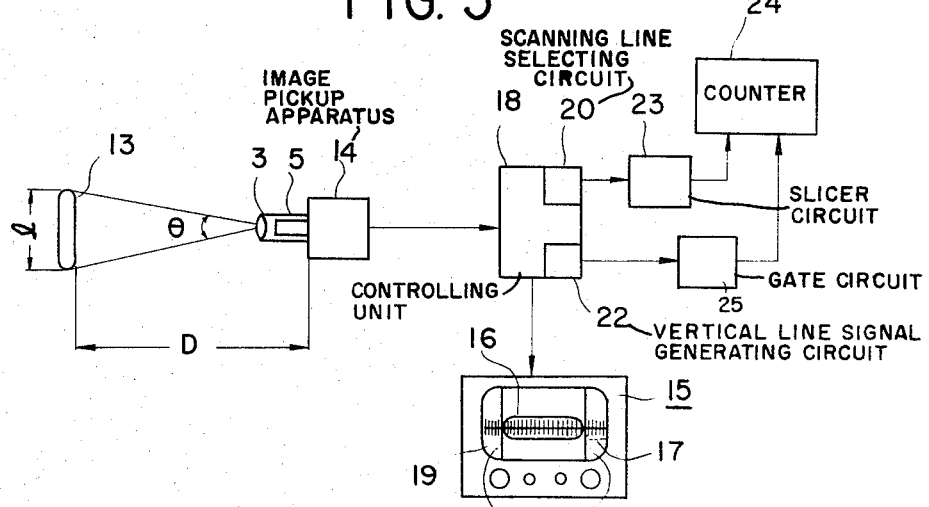
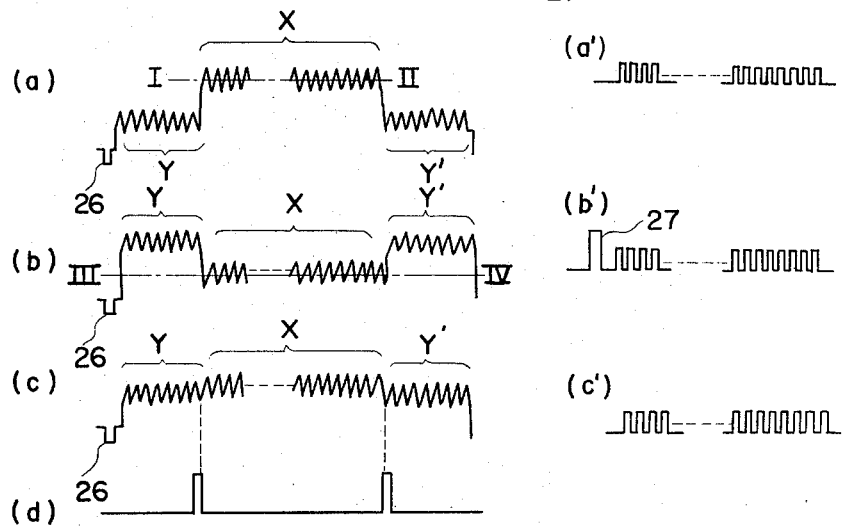

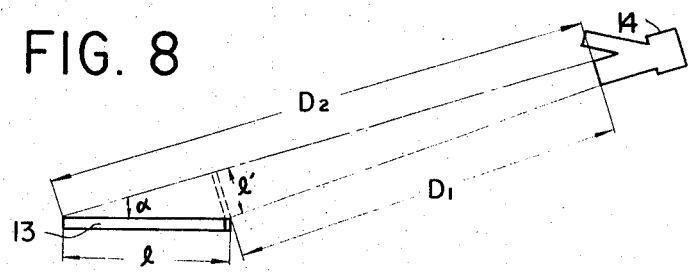
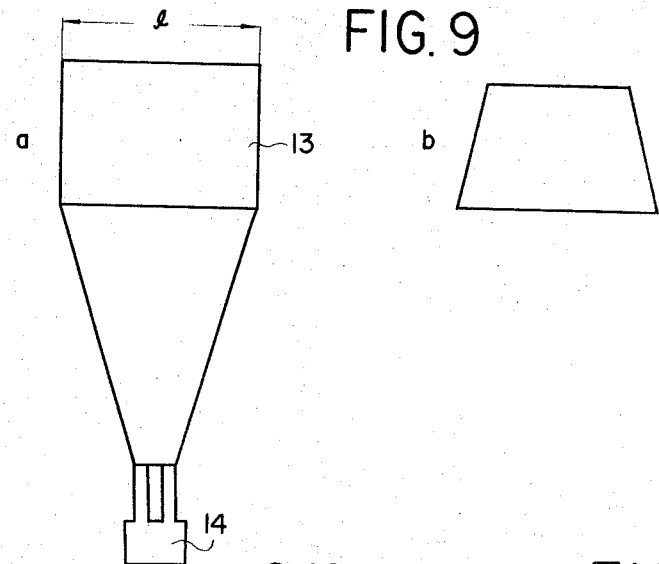
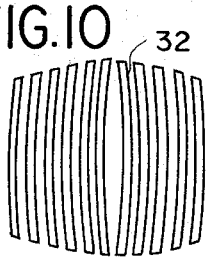
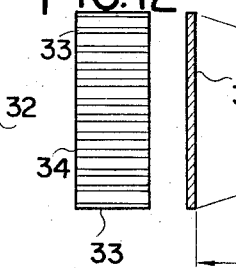
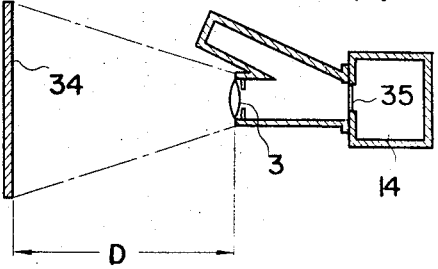
INVENTORS
Tomohiko Akuta
Yoshio Honsyō
Sinya Hashirizaki
Teruo Hiruma
Kazuo Kurasawa INVENTORS
Tomohiko Akuta
Yoshio Honsyō
Sinya Hashirizaki
Teruo Hiruma
Kazuo Kurasawa

METHOD AND APPARATUS FOR DIGITAL MEASUREMENT WITH AN INDUSTRIAL TELEVISION

This invention relates to a method of precisely measuring dimensions of an object to be measured from a remote position by utilizing such image pickup apparatus as an industrial television apparatus.

Heretofore, a noncontacting measurement of a dimension of a moving object, high temperature object or soft object from a remote position was carried out in resort to an optical or electro-optical method. However, such a method had a defect that according to this method it is difficult to elevate the measurement precision or that the structure of an apparatus of a high precision for use in carrying out this method becomes very complicated and is very expensive.

For example, the invention disclosed in the specification of U.S. Pat. No. 3 222 979 relates to a method for generating scale line pulses on the photoelectric surface of an image pickup apparatus, wherein, though free from an influence to be caused by the nonlinearity of the image pickup tube, at most about 100 scale lines would be considered for a standard image pickup tube from the necessity of preventing the photoelectric surface from being peeled off and the limit in the working, because the scale lines are generated by mechanically scribing the same on the photoelectric surface, as is disclosed in the above mentioned patent. Therefore, the measurement precision in such method will be about 1 percent at maximum. Further, there is described another method for generating scale lines, wherein a lattice is placed in front of the photoelectric surface of an image pickup tube or in front of an object to be measured. However, in such method the object lens of the television camera can not be accurately focused and the resolution of the scale lines would be about 100 lines at most, even if the diaphragm, illumination and other conditions could be best adjusted, as are confirmed by experiments made by the inventors of the present invention. Therefore, the measurement precision of this method must be also considered to be about 1 percent at maximum. Further, in the method described in the above mentioned U.S. patent, no television monitor is utilized, but the video signal is taken by so many lines as set with a reset timer, and the lines are amplified as they are and the scale line pulses are counted therefrom. However, this method has a defect that it is impossible to supervise the measuring state, for instance, in such case that any alien substance suddenly appears in the background of the object to be measured there will be produced a noise in the video signal and will be caused a measurement error. However, in this method it is difficult to discover such an abnormal phenomenon, and moreover such method is thought to be likely to be influenced by such abnormal phenomenon, as it is generally necessary to count the video signal by several lines.

Further, it is stated in said U.S. patent that the scale line pulses would appear in an accurate rectangular wave form over the entire width of the object to be measured. However, it is thought that this is possible only if the difference in the brightness between the object to be measured and the background surrounding it is remarkably large, and if this difference is small, the wave form of the scale line pulses in the end part of the object to be measured will collapse and an accurate measurement will be difficult.

There is also a method of measuring dimensions by utilizing an industrial television wherein the number of scanning lines in the part superposed on the image of an object is counted. However, in this method an error attributable to the non-linearity of the characteristics of the television camera apparatus, particularly of the image pickup tube, comes up to at least 2 percent. Therefore, this method can not be used for the precise measurement of dimensions, even if the number of scanning lines is increased. Further, as the measuring time requires one round of vertical scanning (usually one-thirtieth second), it is impossible to measure an object moving in the direction of measuring the length by this method.

An object of the present invention is to make it possible to measure at a high precision the dimensions of an object to be measured by adding a special device to an image pickup apparatus as a comparatively simple industrial television apparatus.

A further object of the present invention is to measure the dimensions of an object to be measured with an apparatus wherein, in measuring the dimensions at a high precision as mentioned above, a distorted scale is made in advance in response to such arrangement relation as the distance or opposed angle between the object to be measured and such image pickup apparatus as a television camera, so that the axial direction of the said scale arrangement may coincide with the direction of the horizontal scanning line and is imaged as superposed on the image of the object to be measured on the photoelectric surface of the image pickup apparatus, and the video output signals of the scale lines corresponding to the dimensions of the object to be measured are detected and counted by means of a scanning line selecting circuit.

Preferred embodiments of the present invention shall be explained with reference to the following drawings in which:

FIG. 1 is a schematic view of an image pickup apparatus to be used in the method of the present invention;

FIG. 2 is a view for explaining an original of scale lines to be used in the image pickup apparatus in FIG. 1;

FIG. 3 is a schematic view of the system for use in the present invention;

FIG. 4 is a graph illustrating measuring operations according to the present invention;

FIG. 5 is a view illustrating another example of fitting an original of scale lines;

FIGS. 6 and 7 are views illustrating applications of the present invention;

FIGS. 8 and 9a are schematic views illustrating the arrangement wherein the object to be measured is not correctly opposed to a video signal forming device;

FIG. 9b is a view of the video picture in the case of FIG. 9a;

FIG. 10 is a view of an image pickup of equidistant scale base lines placed at a very near distance from a video signal forming device;

FIG. 11 is a view showing an example of a method of forming an original of distorted scale lines of the present invention;

FIG. 12 is a plane view of a scale standard plate;

Figure 13:
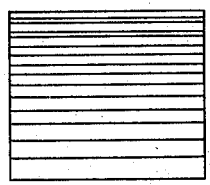
FIGS. 13 and 14 show an original of scale lines as arranged diagonally to the plate surface.

Embodiments of the present invention shall be explained in the following. FIG. 1 shows an image pickup apparatus 14 such as a television camera for measuring dimensions. 1 is an image pickup tube of any type used in a television camera. 2 is its photoelectric surface. 3 is an object lens for the television camera. For the measurement of dimensions at a high precision, an optical lens having little distortion is used. A scale line projecting device 5 is fitted above or below the lens drum 4 of the lens 3, that is, in the vertical scanning direction of the television. As is shown in FIG. 1, in the structure of this projecting device 5, a light source lamp 6 is provided in the lens drum shielded from any outside light, the light of the lamp 6 is collected by a reflector 7 and condenser 8 and is radiated on to an original 9 of scale lines, and an optical image of the scale line original 9 is accurately focused on the photoelectric surface 2 of the image pickup tube 1. The scale line original 9 is of such exact vertical-stripe pattern having regular intervals as is shown in FIG. 2 or is of such stripe-pattern as is shown in FIGS. 12 to 16 and is prepared, for example, by photographing on a reduced scale an accurate scale chart having a number of scale lines corresponding to a required measurement precision by using such a precise camera as usually used in making photographic plates or the like. The maximum limit of the number of scale lines, that is, of the measurement precision is determined by the resolution in the horizontal direction of the industrial television to be used. With an ordinary industrial television, about 500 lines are possible. With a television of high resolution, up to about 1,000 lines are possible. Further, it is most efficient to make the width of the scale line and the width of the spacing equal to each other. Further, for the projecting lens 10 is used an optical lens having little distortion in response to the required measurement precision.

With the above mentioned scale line projecting device 5, scale lines of a fixed spacing are projected in the direction of the horizontal scanning line on the photoelectric surface 2 along the central diametral direction of the image pickup tube 1.

FIG. 3 shows an arrangement of one example of the entire apparatus in the case of measuring dimensions according to the present invention by using the image pickup apparatus 14 in FIG. 1. That is to say, the length of an object 13 whose dimensions are to be measured is made $l$, the image pickup apparatus 14 in FIG. 1 is fixed in a position at a fixed distance D from the object 13 and the image of the object 13 to be measured is focused on a photoelectric surface (2 in FIG. 1) of an image pickup tube by adjusting the object lens 3. However, in order to prevent any error from being caused due to angular alignment, D is made large with respect to $l$. Then, an image 16 of the object 13 and image 17 of the scale lines projected by the scale line projecting device 5 in FIG. 1 will appear on the picture plane of a monitor 15. Therefore, the angle of the image pickup apparatus 14 is to be adjusted by any proper method so that the direction, in which the length of the object 13 or therefore of its image 16 is to be measured, may coincide with the direction of the horizontal scanning line of the television and the image 17 of the scale lines may overlap with the width direction of the image 16. A controlling unit 18 driving the image pickup apparatus 14 and monitor 15 comprises an ordinary television driving circuit and further there are incorporated into the said controlling circuit following circuits, that is, a scanning line selecting circuit 20 for selecting any one horizontal scanning line, indicating it with a white or black line 19 on the picture plane of the monitor and taking out a video signal output for one scanning line, and a vertical line signal generating circuit 22 for indicating any two movable vertical lines 21 on the picture plane of the monitor and taking out a scale pulse signal which corresponds to the width of the vertical line.

A scanning line 19 crossing the scale line image 17 is selected by adjusting the scanning line selecting circuit 20, while observing the image appearing on the monitor 15, and its output is led to an electronic counter 24 through a slicer circuit 23.

Now, in case there is a remarkable difference in the brightness between the object 13 to be measured and its background, for example, in case the object 13 is remarkably brighter than the background, the video signal output of one horizontal scanning line selected so as to cross the scale line image will be as shown in FIG. 4a. That is to say, the part X corresponding to the bright object 13 to be measured is higher in the average signal level, while the parts Y' and Y corresponding to the dark backgrounds on the right and left are lower in the average signal level. In each part of X, Y and Y', pulse train signals corresponding to the scale line image 17 appear as overlapped. Therefore, this video signal output is to be sliced at a voltage level proper to take out only such pulses in the part X as are shown by the chain line I-II in FIG. 4a with the slicer circuit 23, the low frequency component is to be cut with a filter circuit as required and the pulse wave form is to be shaped by using a wave form shaping circuit so that the said pulse wave may be of a wave form easy to count the pulse train. The pulse wave form in this state is as shown in FIG. 4a'. This pulse train is counted by the electronic counter 24 and the number n of pulses is determined thereby. This number $n$ of pulses coincides with the number of projected scale lines corresponding to the length of the optical line on the photoelectric surface of the image pickup tube, said length of the optical line corresponding to the length $l$ of the object 13 to be measured. As the distance D between the object 13 to be measured and the image pickup apparatus 14 is constant, the number n corresponds to the length $l$ with an accurate proportional relation. Therefore, when a standard test piece (of a length L), whose length has been measured accurately by any proper method, is placed in the position of the object 13 to be measured in advance, the length $l$ of the object to be determined will be represented by the following formula, if the number of pulses known by the measurement with the apparatus shown in FIG. 3 according to the same method as the above described is made N :

$$l = L/N \times n \qquad (1)$$

Therefore, once the relation between L and N is determined in advance, unless the distance D varies, the length $l$ of any object coming into the field of vision of the image pickup apparatus may be measured.

After the measurement, the electronic counter 24 is automatically reset by utilizing such horizontal synchronous signal (for the next frame) as is shown, for example, by 26 in FIG. 4 or the indicated value is reset with a manual switch.

Now, in case the brightness of the object 13 to be measured is remarkably lower than that of the background in FIG. 3, the video signal output of the horizontal scanning line selected so as to cross the scale line image by the same method as is described above will be as shown in FIG. 4b in which the relation of the high and low signal levels is reversed to that in FIG. 4a. Therefore, if only the component of this video signal output on the negative side as seen from such voltage level as crosses only such pulse train of the part X as is shown by III – IV in FIG. 4b is taken out and, as required, the filter circuit and wave form shaping circuit are used, such pulse train as in FIG. 4b' will be obtained. As b' contains not only the pulses corresponding to the part X but also a pulse 27 due to the horizontal synchronous signal 26, in the case of counting the pulse train of b' with the electronic counter 24 in FIG. 3, the measured value must be reduced by 1. If this ($n − 1$) is used in place of n in the formula (1), the length l of the object may be measured in the same manner as in the above described method.

Now, if there is no great difference in the brightness between the object 13 to be measured and the background in FIG. 3, there will be substantially no difference in the pulse wave heights in the parts X, Y and Y' corresponding to the object and backgrounds as shown in FIG. 4c, and therefore the pulses of only the part X of the video signal output of the horizontal scanning line selected so as to cross the scale line image by the same method as is described above cannot be taken out by slicing. In such case, if the image taken by the monitor 15 in FIG. 3 is observed, both ends of the object may be identified. Therefore, if the vertical line signal generating circuit 22 is adjusted so that two vertical lines 21 may be tangential respectively to both ends of the object and the output signal is taken out, two scale pulses corresponding to both ends of the image of the object as in FIG. 4d will be obtained. These scale pulses are put into the gate circuit shown by 25 in FIG. 3, and there is caused such controlling operation that the gate of the electronic counter 24 may be opened by the first pulse and closed by the next pulse. Therefore, the pulse train input counted by the electronic counter 24 will be as shown in FIG. 4c', and pulses of scale lines superposed on the optical image of the object will be accurately counted. Further, as is described above, the wave form shaping circuit and filter circuit are used.

Instead of the above described method of identifying both ends of the image of an object by the vertical line signal generating circuit 22 in FIG. 3, there is another method wherein the same effect is obtained by providing an end position regulating device 12 adjacent to the scale line original 9 in the scale line projecting device 5 shown in FIG. 1. The details of the end position regulating device 12 are as shown in FIG. 5. It is a device wherein two nontransparent movable shutters 28 are supported by a guide 29 so as to be movable in the horizontal direction and a precision screw device 30 for adjusting fine movements is provided at the upper end of each shutter respectively so that the position of each movable shutter 28 may be finely adjusted. Therefore, as only the part of the image of the scale line original 9 held between the two movable shutters 28 will be focused, the same pulse train as in FIG. 4c' will be obtained and the length of the object can be measured in the same manner as in the above described method, when adjusting the position of the movable shutters 28 so as to be tangential to both ends of the image of the object reflected on the monitor, while observing the image.

In the explanation of each of the above described embodiments it is described that the image of the object in FIG. 3 must be superposed on the image of the scale lines. However, the measurement of dimensions is also possible, even if the image of the object is not superposed on the image of the scale lines, if adopting a method, wherein the vertical line signal generating circuit 22 or the end position regulating device 12 in FIG. 1 is used. But, it is, of course, necessary that the horizontal scanning line to output video signals should be superposed on the image of the scale lines. FIG. 6 shows a monitor image in this case.

Further, as shown in FIG. 7, when a scale 31 is fixed to a proper supporter by the side of the object 13 to be measured it is possible to adopt also a method, wherein, likewise as is shown in FIG. 6, the number of the scale lines of the scale 31 corresponding to the length of the image of the object is pulse-counted in the same manner as in the above described procedure by using the vertical line signal generating circuit 22 or the end position regulating device 12, while observing these images reflected on the monitor. Next, the precision achieved by the dimension measuring method of the present invention shall be described.

First of all, regarding to the optical distortion attributal to the object lens 3 and the lens 10 for projecting the image of the scale line original of the image pickup apparatus as shown in FIG. 1, it can be made negligibly small by adopting lenses designed and manufactured for the purpose of the measurement. Therefore, the combined error of the optical image of the object to be measured and the optical image of the scale lines on the photoelectric surface of the image pickup tube can be easily made less than 0.1 percent.

Then, in the process of converting the images to video signals, on account of the mechanical asymmetry of the deflecting coils or electrodes of the image pickup tube and the nonlinearity of the deflecting voltage wave forms, there will be produced distortions of more than 5 percent in an ordinary television and of about 2 percent even in an apparatus particularly precisely manufactured and adjusted. Such distortions act exactly the same on the optical image of the object to be measured and the optical images of the scale lines on the photoelectric surface respectively. Therefore, in the method of the present invention wherein the number of the scale line images in the part corresponding to the optical image of the object is counted, the influences of the distortion errors will cancel each other whereby, the signal will not be affected thereby. Thus, there can be obtained a high precision of the resolution, such as 0.2 to 0.1 percent, which is substantially determined by the number of the scale lines, that is, by the limit of the resolution in the horizontal direction of an industrial television (about 500 lines usually or about 1,000 lines according to a special circuit).

A further feature of the present invention is that, the measurement is carried out in a very short time corresponding to within one horizontal scanning line, which amounts to less than one-fifteenth, 750 seconds in an ordinary television apparatus. Therefore, if the residual image is eliminated by using such non-cumulative type image pickup tube, as, for example, an image detector, it will be possible even to measure an object moving at a high speed in the length measuring direction of thereof. For example, in the case of measuring the length of a cut plate on a belt conveyer of a speed of 4m./sec., the error due to the horizontal scanning of a television will be only less than 0.25mm. However, in such case, in order to confirm that the entire length of the object to be measured has entered the field of vision of the image pickup apparatus, there is taken a method wherein, for example, a photoelectric type approach relay or the like is used to excite a dimension measuring circuit or to stop the vertical scanning of the television, but to cause only the horizontal scanning to operate so that the dimension of each scanning line may be measured and the maximum value may be made the length to be determined.

Further, according to the present invention an accurate measurement of an object to be measured is possible even if the object to be measured is incorrect. That is, the object image will be distorted when optically taken, for instance, if the opposed distance between the object and the pickup apparatus is too small, or if both are not correctly opposed, even position between the image pickup apparatus though the said distance between them is large enough.

For example, if the distance D between the object 13 to be measured and the image pickup apparatus 14 is not large enough for the length $l$ of the object as shown in FIG. 3, the visual angle $\theta$ of the object lens 3 of the image pickup apparatus will become so large that the influence of aberration will become large, the optical image of the object to be measured will be distorted, its response to the scale image will be impaired and errors will be produced in the measured dimensions.

Also, in case the distance D between the object 13 and the image pickup apparatus 14 is considerably larger than the length $l$ of the object 13 but the image pickup apparatus 14 is not correctly opposed to the object 13, for instance, at an oblique angle $\alpha$, as shown in FIG. 8, the relation between the length $l$ of the object 13 to be measured and the apparent length $l'$ from the image pickup apparatus is represented approximately by the following formula:

$$l' = l \sin\alpha \qquad (2)$$

Therefore, if the scale original is of an equidistant scale, the apparent length $l'$ will be measured and the measurement error will be very large. Further, even if the length measuring direction is at right angles with the image pickup apparatus 14, if the image pickup apparatus 14 is placed in a position away from the center line of the object 13, the image will be distorted as exemplified in FIG. 9b and therefore no equidistant scale lines can be used.

Also, depending on the near point distance $D_1$ and remote point distance $D_2$, the reducing magnification of the optical image by the object lens 3 will so greatly vary that the image will be further distorted.

In the present invention, even in such case, an accurate measured value can be obtained. It shall be further explained in the following.

When the distance D to the image pickup apparatus is small with respect to the length $l$ of the object to be measured as exemplified in FIG. 11, the surface of the object 13 on which an equidistant pattern is described, will be imaged on the photoelectric surface 2 of the image pickup tube 1. However, this image will be distorted because the distance D between the object 13 and the image pickup apparatus 14 is not large enough for the length $l$ of the object. FIG. 10 shows an example thereof, wherein the equidistant pattern on the surface of the object is imaged as greatly distorted.

Therefore, if such distorted scale lines as are exemplified in FIG. 10 are projected in advance on the photoelectric surface 2 by the scale line projecting device 5, even if the object 13 to be measured is of any dimensions, the image distortion of the object 13 to be measured will coincide with the scale line 32 having exactly the same distortion rate as of the former and the measurement errors will cancel each other. Therefore, unless the distance D showing the same distortion rate varies, an accurate measurement of dimensions can be achieved. In order to image distorted scale lines 32 having the same distortion rate as superposed on the image of the object 13 to be measured, the distorted scale original having the same distortion rate as is determined by the distance D is to be projected while using an optical lens, which is so precise that its distortion may be neglected, for the projecting lens 10 of the scale line projecting device 5, or an equidistant scale original is to be projected by using a lens, with which a distortion rate as determined by the distance D can be obtained, for the said projecting lens 10.

In order to obtain a distorted scale line original, as exemplified in FIG. 11, a scale plate 34, on which equidistant scale lines 33 are described over the maximum dimension range to be measured, is placed in a position at a distance equal to the distance D between the object 13 to be measured and the image pickup apparatus so that the scale lines 33 may be at a right angle with the dimension measuring direction, that is, the scanning line direction and is photographed at the same distortion rate as the object lens 3 of the image pickup apparatus 14 so that the scale plate 34 may be imaged on a photographic film 35 placed in the position of the photoelectric surface 2 of the image pickup apparatus 14. This photographic plate is used as a scale original.

When the thus obtained photographic plate of the distorted scale is used as the scale line original 9 in the scale line projecting device 5 and is projected onto the photoelectric surface of the image pickup tube by means of the light source lamp 6, reflector 7, condenser 8, projecting lens 10 and diaphragm 11, the scale line image and the image of the object to be measured are superposed because both images have the same distortion rate.

Therefore, when selecting one proper horizontal scanning line from these superposed images and counting the scale lines crossing this selected horizontal scanning line and superposed on the image of the object to be measured, the dimensions to be measured can be obtained.

The measurement of an image distorted by the distance D between the object 13 to be measured and the image pickup apparatus 14 has been described in the above. However, even if the object 13 to be measured is not correctly opposed to the image pickup apparatus 14, but is opposed to it at an oblique angle $\alpha$, a distorted scale original at the oblique angle $\alpha$ may be made in advance in the same manner as is mentioned above and may be projected and superposed on the image of the object to be measured so that the dimensions may be measured.

Figure 14:
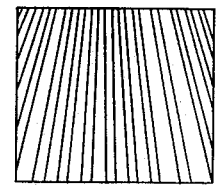

Further, the distorted scale original corresponding to the oblique angle $\alpha$ can be made not only by utilizing the photographic plate making process but also from the values of the image reduction rates in the respective parts of the object to be measured as calculated by the above mentioned formula (2). The scale line originals exemplified in FIGS. 13 and 14 are for such arrangements as in FIGS. 8 and 9. FIG. 13 shows a scale line original for measuring the length $l$ as in FIG. 8. FIG. 14 shows a scale line original for measuring the length $l$ in FIG. 9a.

Now a method of making a scale line original shall be explained.

Figure 15:
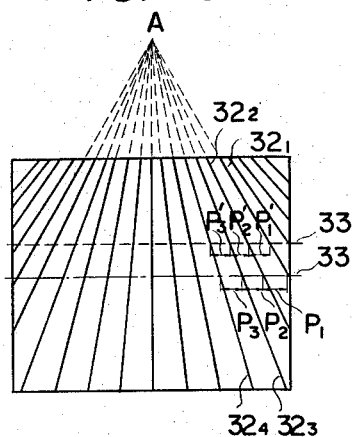
FIG. 15 is a view of scale lines made in the present invention.

FIG. 15 shows radial scale trains in a scale line original used in the method of the present invention wherein the scale lines are radially arranged at equal spacings $P_1$, $P_2$, ..... in the horizontal direction.

That is to say, a distance D between the object 13 to be measured and the image pickup apparatus 14 is made a standard, scale lines $P_1$, $P_2$, ..... are so determined as to correspond to such unit required to measure the length as, for example, 1mm. or 1cm. and radial lines $32_1$, $32_2$, ..... are described with a spacing reduction rate corresponding to the variation of the distance D on the basis of these scale lines $P_1$, $P_2$, .....

Figure 16:
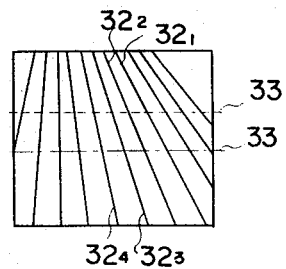
FIG. 16 is a view of scale lines in case the image pickup apparatus is in a position deviated from the object to be measured.

These radial lines $32_1$, $32_2$, ..... can be made not only by the above mentioned method but also by arranging and dotting in turn scale points at a spacing corresponding to a unit length at each distance D in a direction intersecting at right angles with the horizontal scanning line. Further, in case the image pickup apparatus 2 is to be provided as deviated from the object 13 to be measured, a distorted scale is used. In such case, the scale line spacings in the horizontal direction will not be constant, consequently corresponding spacings depending upon only the variation of the distance D are to be determined and arranged to make such radial lines. FIG. 16 is of an example of such case.

It is needless to say that the extensions of the above mentioned radial lines $32_1$, $32_2$, ..... are radial lines converged at one point A.

If this scale train is set in the position of setting the scale line original provided in the scale line projecting device 5, which is installed in the image pickup apparatus as shown in FIG. 1, the scale can be made to coincide with the image of the object to be measured. In case the distance D between the object 13 to be measured and the image pickup apparatus 14 varies during the time of measuring the dimension, it becomes possible to measure accurately the dimension, if the scale line original setting point is moved and adjusted so that the scale points of the spacings $P_1'$, $P_2'$, $P_3'$, ..... corresponding to the distance D at that time may be superposed on the horizontal scanning line 19. Further, in such case, the dimension can be measured also by electrically moving the horizontal scanning line 19 of the television for selectively taking out video signals so as to cause it to coincide with the scale lines of the spacings $P_1'$, $P_2'$, ..... corresponding to the distance D, imaging said part as superposed on the part to be measured of the object 13 and counting the scale lines.

Thus, according to the present invention, the dimensions of any moving object, high temperature object or soft object can be precisely measured without touching it.

In the foregoing the measurement of the length between both ends of an object to be measured has been explained. However, the method of the present invention can be extensively applied also to a method for obtaining an increased measurement precision, wherein one end of the object is measured or the positions of the respective ends are measured with two television cameras, the length of the fixed part is separately measured and then the whole length of the object is calculated from the measured values as above mentioned, and further to dimension measurements of various kinds including the measurement of a specific position of an object and the measurement of a displacement.

What is claimed is:

1. A method for measuring dimensions of a moving or stationary object from a remote position with an image pickup apparatus: said method comprising distorting a graduated scale according to the relationship of the distance or opposed angle between the object to be measuring and said image pickup apparatus; projecting said distorted scale from a first direction onto a photoelectric surface of said image pickup apparatus such that said scale extends in the direction of a horizontal scanning line on said photoelectric surface; focusing from a second direction onto said photoelectric surface of said image pickup apparatus an image of the object to be measured such that said object image is superposed on an image of said scale, said object being positioned at said distance or opposed angle with respect to said image pickup apparatus; taking out as voltage pulses a video signal output of the said projected scale corresponding to the length of the optical image of the dimension to be measured by means of a scanning line selecting circuit; and counting the number of said voltage pulses.

2. A method as claimed in claim 1, wherein said step of distorting comprises aligning a nondistorted scale at said distance or opposed angle, and projecting a distorted image of said nondistorted scale onto a photographic plate located at the normal position of said photoelectric surface, thereby forming said distorted scale.

* * * * *